UNITED STATES PATENT OFFICE.

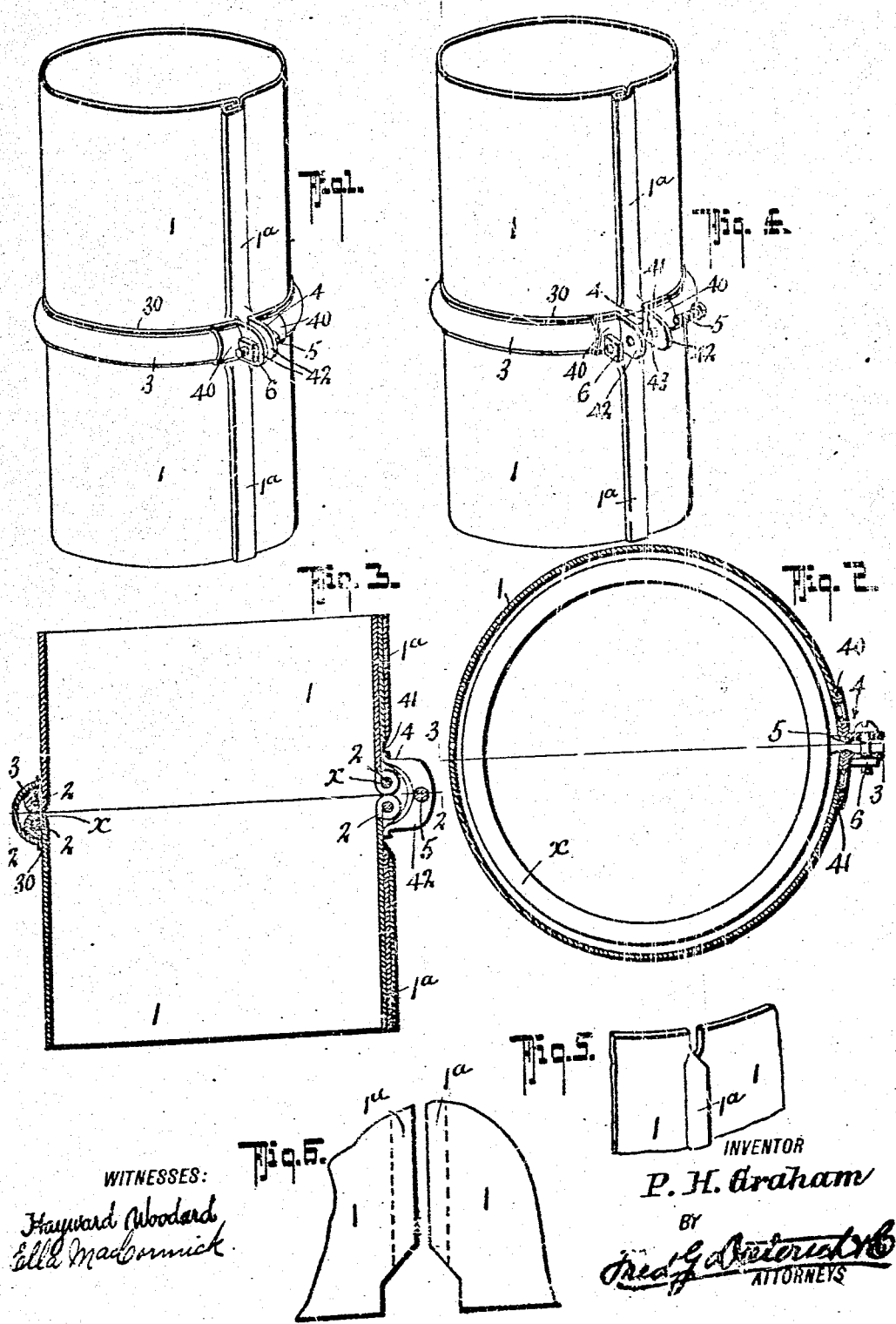

PATRICK H. GRAHAM, OF SACRAMENTO, CALIFORNIA, ASSIGNOR OF ONE-HALF TO JOHN H. HANNAH, OF COLUSA, CALIFORNIA.

STOVEPIPE-JOINT.

984,086.     Specification of Letters Patent.     Patented Feb. 14, 1911.

Application filed June 21, 1909. Serial No. 503,358.

*To all whom it may concern:*

Be it known that I, PATRICK H. GRAHAM, of Sacramento, in the county of Sacramento and State of California, have invented a new and Improved Stovepipe-Joint, of which the following is a specification.

My invention relates to improvements in that type of stove pipe joints or connections that comprehend, generally, a band adapted to encircle the meeting ends of two pipe sections and having clamping means for drawing and holding the said two sections together and primarily my invention has for its object to provide an improved construction of means for joining and clamping two pipe sections together, of a simple and economical nature, especially designed for making a neat joint, capable of being readily applied, and by which the two sections can be securely joined and yet have independent rotary movement so that either or both sections can be readily adjusted for connecting with elbows of other pipe sections or flues as conditions may make desirable.

My invention consists in a stove pipe joint that embodies the peculiar construction and novel arrangement of parts, all of which will be hereinafter fully explained, specifically pointed out in the appended claims and illustrated in the accompanying drawing, in which:—

Figure 1, is a perspective view showing my improved pipe joint as applied for use. Fig. 2, is a detail horizontal section on a somewhat enlarged scale, taken on the line 2—2 on Fig. 3. Fig. 3, is a cross section on the line 3—3 on Fig. 2. Fig. 4, is a detail view that shows the ends of the clamping band mounted on the pipe ends and separated, the clamp screw and nut being also shown separated. Fig. 5, is a detail view of one end of one pipe section, before the reinforcing wire receiving bead is formed thereon. Fig. 6, is a detail view of the upper or joint ends of the pipe section in their blank shape.

In carrying out my invention, the pipe sections are bent up from a blank form in the usual manner but the opposite ends of the said blank form are shaped as shown in Fig. 6 from which it will be seen the opposite portions 1ª—1ª of the blank or body 1 that form the longitudinally extended interlocking beads stop short of the end of the blank so that the said end when bent over forms a transverse bead of uniform shape in cross section and having an uninterrupted smooth peripheral surface when bent over the reinforcing wire 2, as best shown in Figs. 2, 3 and 4, from which it will also be seen that by reason of forming the end of the pipe section body, as stated, the solid head or rim X is at a point beyond the interlocked beads or ends 1ª—1ª, the reason for which will presently appear. By reason of constructing the pipe sections in the manner shown and described, the ends of each section are in the nature of a solid rim, each forming a solid bearing to oppose its mate.

For conveniently joining the pipe formed as stated, I provide a ring or band 3 of spring metal, concaved in cross section and of sufficient width to snugly fit over the rims or beads x—x of the adjacent ends of a pair of pipe sections, the edges being turned out at right angles to form bearing flanges 30 adapted to rest solidly against the pipe sections, the concavity of the said band and the bearing flanges being relatively such that the band when drawn together in the manner presently explained, will snugly and firmly hold the two solid beaded ends of the two pipe sections, but by reason of the flanges 30 bearing solid against the said pipe sections the band 3 is held from binding so tightly against the beads of the pipe sections as to prevent each section having rotary movement with respect to each other and the clamping band. The band 3 carries at each end a solid metal right angled bracket piece 4, the foot portion 40 of which is curved to fit on the external surface of the ends of the band, and the said bracket is riveted to the end of the band 3, its opposite edges being also bent at right angles to form bearing surfaces 41 to solidly engage the body of the pipe section. Each bracket plate 4 has an outwardly projected ear 42 and each of said ears is provided with an aperture 43 for the passage of a clamp screw 5 that receives the clamp nut 6, it being obvious that by tightening up the screw 5 the band will be closely drawn over the adjacent solid and beaded ends of the two pipe sections and secure them firmly to each other. By reason of the edges of the band terminating in flat bearing flanges the pressure of the band will be against the body of the pipe sections and not in frictionally tight engagement with the beaded ends of the said pipes, such connection therefore, while serving as a convenient and effective means for joining the pipe ends, also forms as it were, a socket for the said ends in which either or both may be turned so that one or both of the joined sections may be adjusted to proper positions for joining with elbow members or specially positioned flues.

By forming the pipe ends as stated and shown, a joint or connection can be made practically as strong and durable as any other portion of the pipe and which effectively prevents the escape of smoke and sparks and as the pipe ends are rigidly held on each other it is impossible for them to telescope, the pipe sections being at all times held in proper vertical alinement.

Having thus described my invention, what I claim is:

1. In a pipe joint, the combination with a pair of pipe sections each having an annular bead at its end and a reinforcement ring in said beads, said pipe sections being placed end to end with their beads in contact, each of said pipe sections having a longitudinal seam terminating short of such beads to leave a space between said longitudinal seams and the respective beads; of a band concaved in cross section to extend around and inclose the contacting beads of the pipe section, the opposite edges of the band having flat bearing surfaces held in a direction parallel to the longitudinal axis of the pipe sections, said longitudinal seams terminating adjacent to said band, an angle piece secured to each end of the band, a screw bolt passing through said angle pieces, and a nut on said bolt, one edge of said nut lying in contact with the band part of said angle piece to prevent turning of said nut, substantially as shown and described.

2. In a pipe joint, the combination with a pair of pipe sections each having an annular bead at its end and a reinforcement ring in said beads, said pipe sections being placed end to end with their beads in contact, each of said pipe sections having a longitudinal seam terminating short of such beads to leave a space between said longitudinal seams and the respective beads; of a band concaved in cross section to extend around and inclose the contacting beads of the pipe sections, the opposite edges of the band having flat bearing surfaces held in a direction and inclose the contacting beads of the pipe sections, said longitudinal seams terminating adjacent to said band, an angle piece secured to each end of the band, a screw bolt passing through said angle pieces, a nut on said bolt, one edge of said nut lying in contact with the band part of said angle piece to prevent turning of said nut, said angle pieces lying in alinement with said longitudinal seams and adapted to be drawn toward one another by said bolt and nut at the space between said longitudinal seams and said beads.

PATRICK H. GRAHAM.

Witnesses:
 ALVA LINDSTROM,
 GILBERT P. BEESE.